United States Patent [19]

Perez

[11] Patent Number: 5,528,325
[45] Date of Patent: Jun. 18, 1996

[54] POWER BRACKET FOR PHOTOGRAPHIC CAMERAS

[76] Inventor: Sixto R. Perez, 345 SW. 30 Ave., Miami, Fla. 33135

[21] Appl. No.: 412,675

[22] Filed: Mar. 29, 1995

[51] Int. Cl.$^6$ .................................................. G03B 29/00
[52] U.S. Cl. ............................ 354/81; 354/126; 354/293
[58] Field of Search ............................... 354/81, 82, 126, 354/293; 352/243; 294/139; 348/373, 375

[56] References Cited

U.S. PATENT DOCUMENTS

| | | | |
|---|---|---|---|
| 4,752,794 | 6/1988 | Bohannon | 354/126 |
| 5,121,147 | 6/1992 | Wada et al. | 354/81 |

*Primary Examiner*—Howard B. Blankenship
*Attorney, Agent, or Firm*—J. Sanchelima

[57] ABSTRACT

A power bracket for carrying a camera and different accessories, such as a flash member, a power pack, and a modeling light member along with the pertinent cable connections and a switch. The base of the power bracket removably receives the camera and an arm of an L-shape member is mounted to the underside of an inclined portion of the base suspending the accessories at a forward position relative to the camera, thereby minimizing the interference between the accessories and the upper part of the camera. Also, the inclination of the inclined portion of the base permits a user to manipulate the lens found at the front of the camera. An elongated link assembly is adjustably mounted to the upper arm of the L-shape member and a flash holder arm is pivotally mounted thereto. The flash holder arm includes a flash shoe and the mounting member necessary to rive a shoe and the modeling light member, respectively. In this manner, a user can rotate flash holder arm 180 degrees or at any other between angle, as needed.

8 Claims, 3 Drawing Sheets

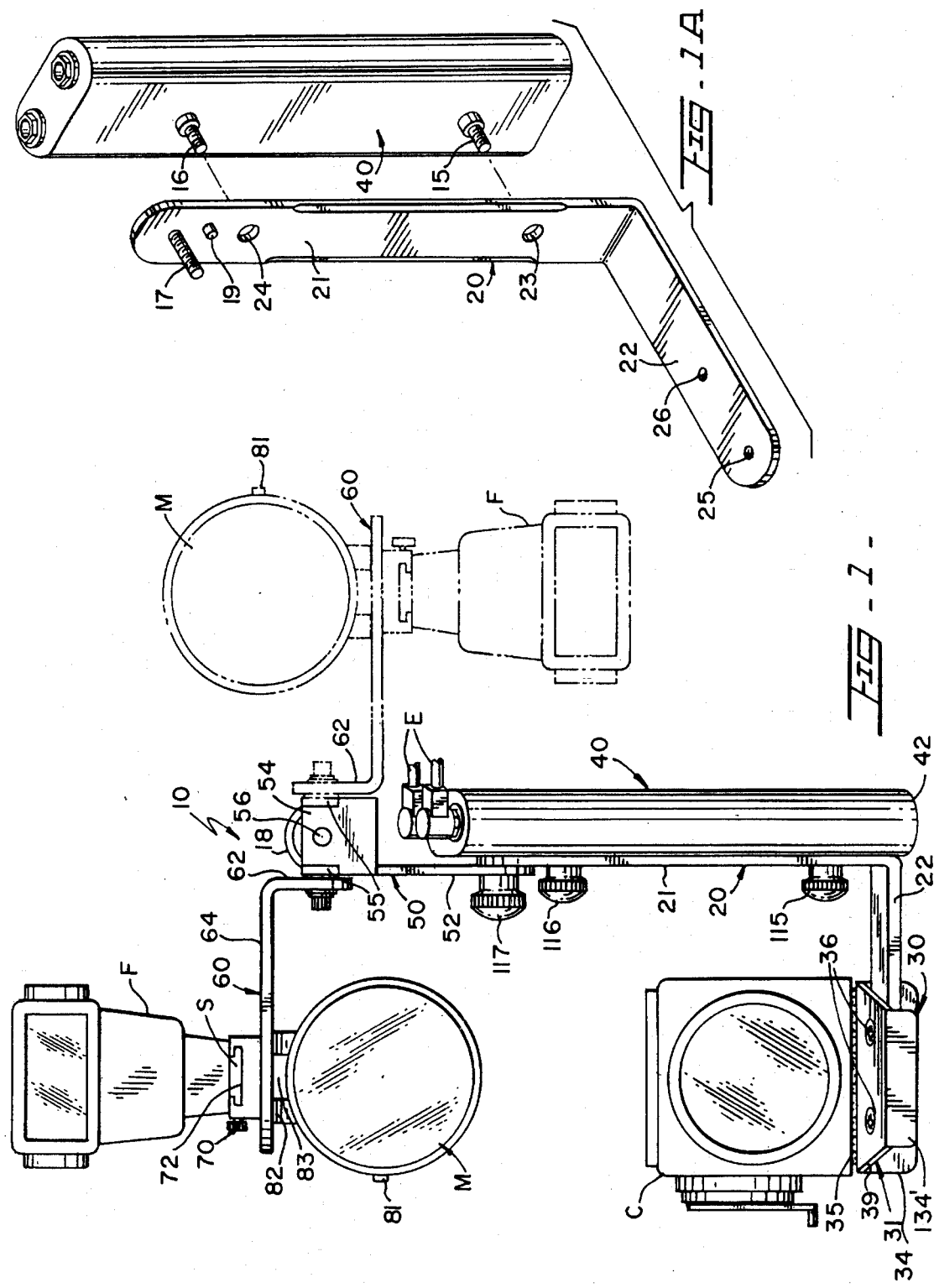

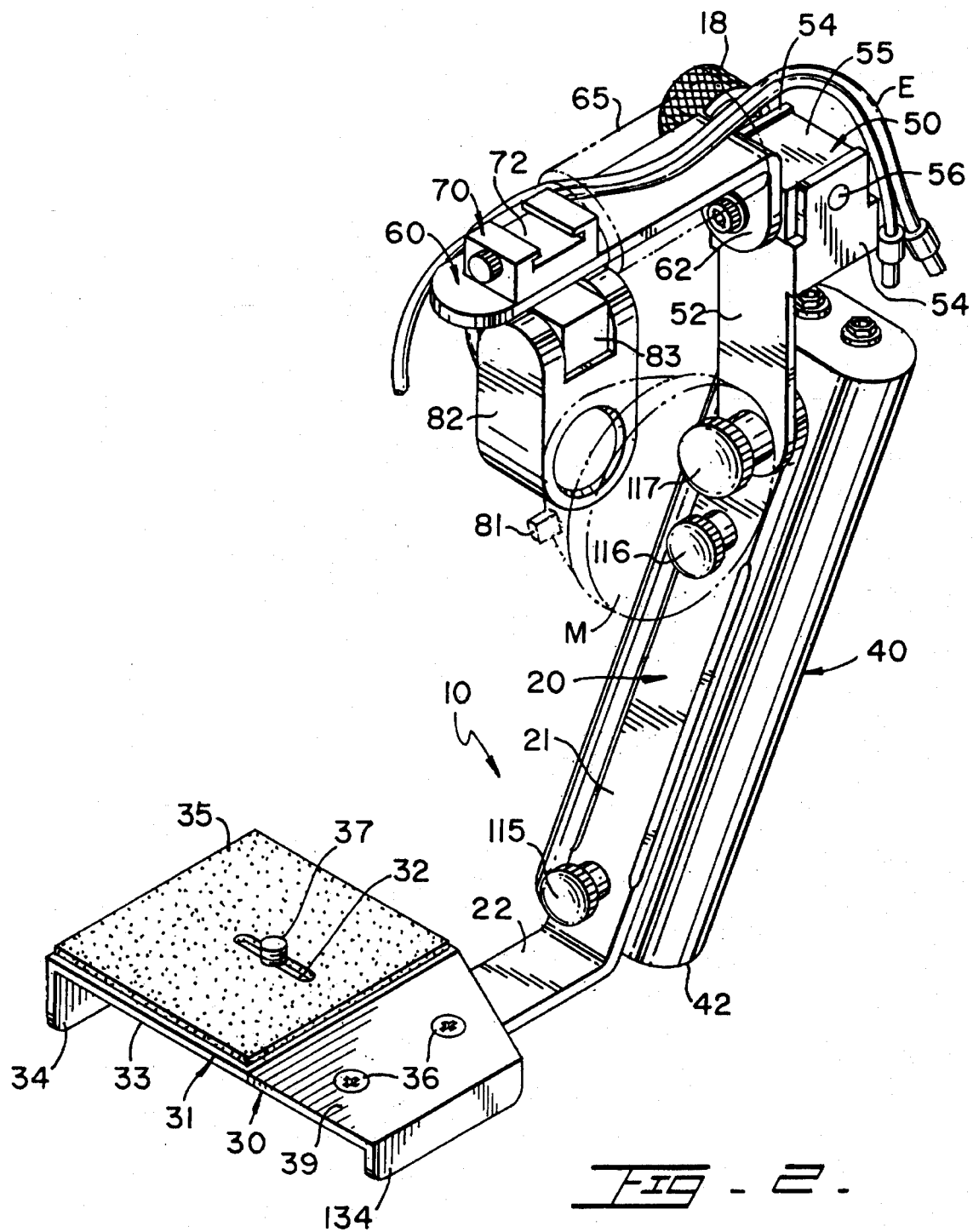
FIG_2.

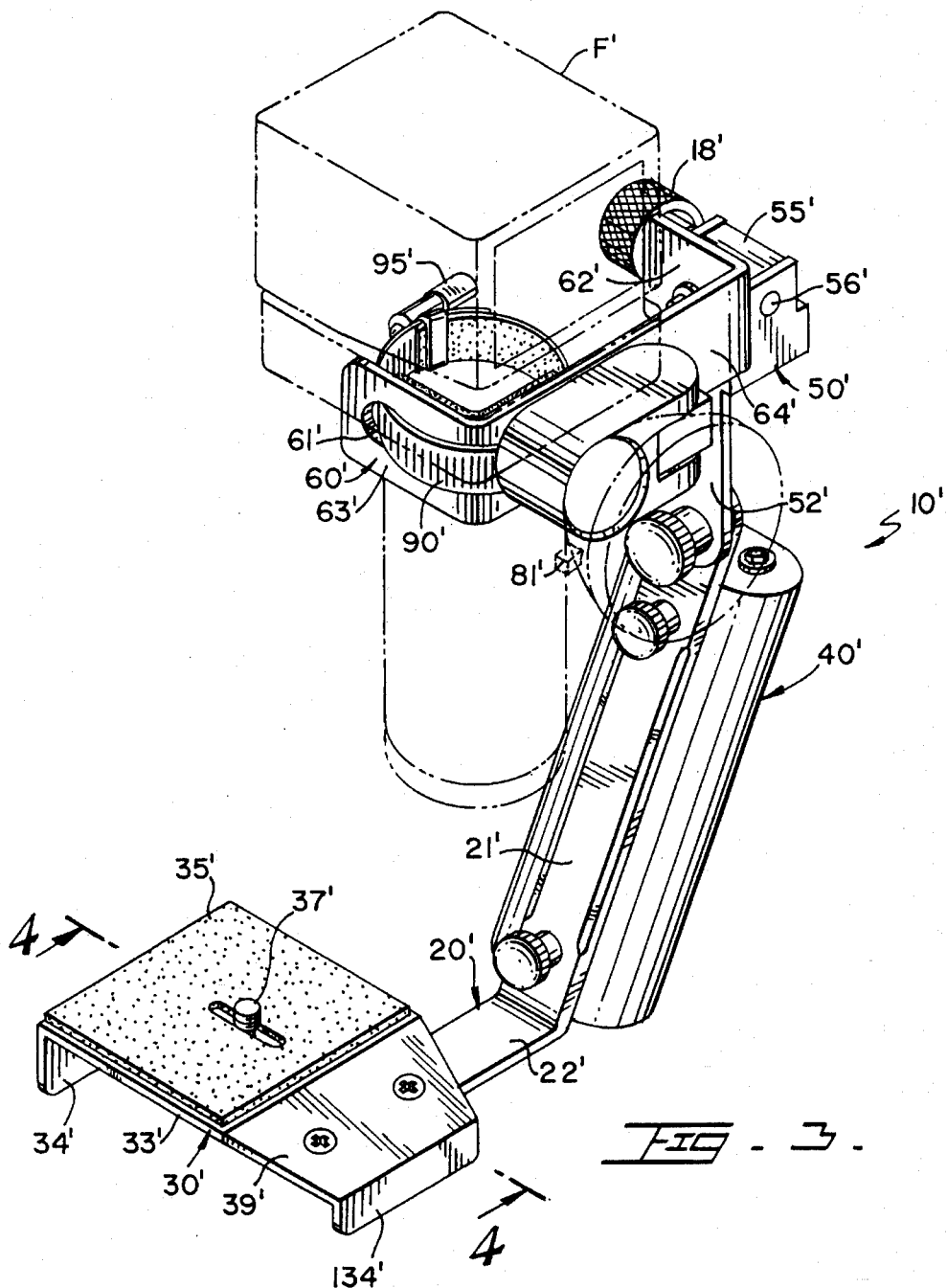
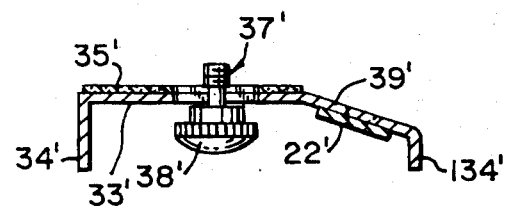

5,528,325

POWER BRACKET FOR PHOTOGRAPHIC CAMERAS

BACKGROUND OF THE INVENTION

1. Field of the Invention

The present invention relates to brackets for photographic cameras, and more particularly, to such brackets that are adapted to carry photographic accessories that would have to be uncomfortably carried by a user on different parts of his or her body.

2. Description of the Related Art

Applicant believes that the present invention is an advance over other bracket systems used at the present time. The conventional bracket assemblies for cameras do not include battery power packs and typically a user carries them in a pouch. Also, the present invention provides for the mounting of a modeling light which is another accessory frequently used by professional photographers. The claimed device permits a user to move the modeling light and flash to different cooperative positions with respect to the camera lens and object. This invention discloses and claims an effective combination of several bracket and holding members that combine camera, flash, modeling light and a battery power pack in a single structure, thereby permitting a user to concentrate more in his or her job rather than juggling these components and possibly damaging them.

SUMMARY OF THE INVENTION

It is one of the main objects of the present invention to provide a power bracket for photographic cameras that permits a user to carry commonly used accessories, such as lamps and batteries, conveniently mounted to one bracket assembly.

It is another object of this invention to provide a power bracket that provides sufficient flexibility to a user for conveniently positioning photographic accessories, as required, with respect to the camera lens and the object being photographed.

It is still another object of the present invention to provide a power bracket that is relatively light but yet sturdy enough to carry a camera and its accessories.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a front elevational view of the preferred embodiment for the power bracket subject of the present application, and shows in phantom an alternate position for the flash and modeling light assemblies.

FIG. 1A is an isometric view of the battery power pack and L-shape support member.

FIG. 2 shows an isometric view of the bracket shown in FIG. 1, without the camera and accessories.

FIG. 3 illustrates an alternate embodiment for the present invention having a clamp for receiving a flash member instead of a shoe mount holder as shown in FIG. 2.

FIG. 4 illustrates a side elevational cross-sectional view of the base assembly used in the preferred and alternate embodiments represented in FIGS. 1; 2 and 3.

DETAILED DESCRIPTION OF THE PREFERRED EMBODIMENT

Referring now to the drawings, where the present invention is generally referred to with numeral 10, it can be observed that it basically includes L-shape support member 20, platform assembly 30 mounted to member 20, battery power pack 40 removably mounted to member 20, upper link assembly 50 and flash holder arm 60.

As shown in FIGS. 1 and 2, platform assembly 30 includes platform pad 35 mounted on horizontal flat portion 33. Portion 33 and inclined flat portion 39 define, with feet members 34 and 134, bench member 31. The inclination of flat portion 39 is sufficient to permit a user to comfortable access the lens of camera C. Platform pad 35 is preferably made out of a corklike material that serves as a cushion between camera C and metallic surface of horizontal flat portion 33. Bolt member 37 keeps camera C in place. Depending on the characteristics of camera C, its position can be adjusted with bolt 37 that protrudes through slot 32, as shown in FIG. 2. The preferred embodiment of power bracket 10, shown in FIG. 1, provides a solid resting support on feet members 34 and 134 of platform assembly 30 and on bottom end 42 of battery power pack 40.

Assembly 30 is rigidly mounted to lower arm 22 of L-shape support member 20 by screw members 36. Screw members 36 pass through threaded openings 25 and 26 located in arm 22, as seen in FIG. 2. Therefore, upper arm 21 ends tip extending upwardly and forward from platform assembly 30 thereby providing additional clearance for camera C. This is particularly useful for large (tall) cameras. Also, for cameras without prisms that require a user to view the object through the camera's view finder from the top.

Member 20, in the preferred embodiment, comprises upper arm 21 and lower arm 22 perpendicularly disposed with respect to each other. Upper arm 21 has openings 23 and 24 through which bolt members 15 and 16 pass and they are received by knurled knobs 115 and 116, respectively. Power pack 40 is removably mounted to arm 21 by threaded members 15 and 16, as best seen in FIG. 1A. Upper arm 21 has, at its upper end and between member 17 and opening 24, locking pin 19. Pin 19 locks upper link assembly 50, thereby preventing its rotation. Power pack 40 has, in the present embodiment, two functions. One of these functions is to provide the electric current source to flash F and modeling light M. The second function is to serve as a handle for power bracket 10, as best seen in FIGS. 1; 2 and 3. Power packs 40 and 40' of embodiments 10 and 10', respectively, contain several battery cells to out-put either 6 or 9 volts, in the preferred embodiment. The selected voltage depends on the flash type used.

The upper portion of the preferred embodiment includes upper link assembly 50, flash holder arm 60, flash shoe 70 and modeling light M. Link assembly 50 has, at its upper end, pivoting member 55 that is rigidly mounted to bent end 62 of arm 60. Member 55 is rotatably mounted to fork ears 54 with pivoting pin 56, thereby permitting arm 60 to rotate 180 degrees. In this manner, a user can rotate camera C and still maintain flash F above camera C, prior to the rotation of the latter. Sometimes a photographer needs to rotate camera C and keep flash F above camera C to avoid side shadows. In other words, the rotation of camera C is compensated with the rotation of member 60 even though a different position of the camera is achieved, which may be desired under certain circumstances. Also, with knurled screw 18, a user can adjust the angle of arm 60 with respect to arm member 52, as best seen in FIG. 1. The lower end of member 50 is removably mounted to the upper end of member 22 by bolt member 17 and knurled knob 117.

Flash holder arm 60 has, in the preferred embodiment, bent end 62 and flat arm 64. End 62 and arm 64 are perpendicularly disposed with respect to each other. Flash holder arm 60 includes flash shoe 70 mounted thereon. Flash shoe 70 includes channel 72 through which hot shoe S of flash F slides. As shown in FIGS. 1 and 2 modeling light M is mounted to bracket member 82 which in turn is mounted to modeling light block 83. Block 83 is mounted to the underside of flash holder arm 60. It is shown in phantom how light M can be swung over 180 degrees. Light M is used in dark situations for focusing and composing the photographic stage. Light M includes switch member 81 to selectively interrupt the light projected.

Foam 65, as is shown in FIG. 2, is designed to hide electric contact cables E and to be used also as a handle cover. Cables E provide the electricity from battery power pack 40 to modeling light M and flash F.

In FIG. 3 alternate embodiment 10' is illustrated. As in embodiment 10, embodiment 10' includes, L-shape support member 20', platform assembly 30', power pack 40' and upper link assembly 50'. L-shape support member 20' includes upper arm 21' and lower arm 22'. Platform assembly 30' is mounted to lower arm 22'. Assembly 30' comprises horizontal flat portion 33', inclined flat portion 39', feet members 34' and 134', and platform pad 35'. In FIG. 4 bolt member 37' is shown secured by knurled knob 38' that secures camera C (not shown) against platform pad 35'.

Flash holder arm 60', in the alternate embodiment, has bent ends 62' and 63' in parallel relationship with respect to each other and separated by flat arm 64'. Ends 62' and 63' and arm 64' form a C "shape", as is shown in FIG. 3.

Instead of flash shoe 70 of embodiment 10, the alternate embodiment uses clamp 90' to hold flash F'. Clamp 90' passes through opening 61' (and another opening not shown) located in flash holder arm 60'. Clamp 90' embraces flash F' and keeps it in place with fastening member 95'.

Foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A power bracket for carrying a camera having a lens assembly, a flash member and a model light member, comprising:

A. a base assembly having first and second flat portions sharing a common side and at an angle with respect to each other, and said first and second flat portions including feet means for supporting said base assembly on a horizontal surface, and said first flat portion having means for removably fastening said camera thereto;

B. an L-shape support assembly having first and second arms, each having a common end and a distal end, and said first and second arms perpendicularly disposed with respect to each other and said first arm being mounted to said second flat portion so that said second arm extends upwardly away from said base assembly;

C. an elongated link assembly having a fork end and a flat end, and said flat end being adjustably mounted to the distal end of said second arm so that the angle between the longitudinal axes of said elongated link assembly and second arm of said L-shape support assembly can be adjusted within a predetermined range;

D. flash holder arm means, having two ends, and one of said ends being pivotally mounted to said fork end, and said flash holder arm means includes mounting means for holding said flash and mounting means for holding a modeling light; and E. an elongated power pack member rigidly and removably mounted to said second arm in parallel and adjacent relationship thereto, and further including cable means connected to said flash member and said modeling light member, and further including switch means for selectively interrupting the connection of said cable means.

2. The power bracket set forth in claim 1 wherein said elongated power pack member includes first and second ends, and said first end being cooperatively positioned with respect to said feet means to provide a solid resting support.

3. The power bracket set forth in claim 2 wherein said mounting means for holding said flash includes a flash shoe holder and said flash includes a hot shoe cooperatively receivable by said flash shoe.

4. The power bracket set forth in claim 3 wherein the angle of said first flat portion with respect to said second flat portion is sufficient to permit a user to operate said lens assembly.

5. The power bracket set forth in claim 4 wherein said flash holder arm means includes means for adjusting and keeping said flash holder arm means at an angular position with respect to said elongated link assembly.

6. The power bracket set forth in claim 2 wherein said mounting means for holding said flash includes clamp means for securing said flash to said flash holder arm means.

7. The power bracket set forth in claim 6 wherein the angle of said first flat portion with respect to said second flat portion is sufficient to permit a user to operate said lens assembly.

8. The power bracket set forth in claim 7 wherein said flash holder arm means includes means for adjusting and keeping said flash holder arm means at an angular position with respect to said elongated link assembly.

* * * * *